US008009607B2

(12) United States Patent
Gunnarsson et al.

(10) Patent No.: US 8,009,607 B2
(45) Date of Patent: Aug. 30, 2011

(54) METHOD AND APPARATUS FOR UPLINK TRANSMISSION TIMING IN A MOBILE COMMUNICATIONS SYSTEM

(75) Inventors: Fredrik Gunnarsson, Linköping (SE); Niclas Wiberg, Linköping (SE); Gunnar Bark, Linköping (SE); Eva Englund, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2783 days.

(21) Appl. No.: 10/128,583

(22) Filed: Apr. 24, 2002

(65) Prior Publication Data
US 2003/0202490 A1    Oct. 30, 2003

(51) Int. Cl.
  *H04B 7/216* (2006.01)
(52) U.S. Cl. .................. 370/320; 370/441
(58) Field of Classification Search .......... 370/332, 370/331, 310, 333, 335, 342, 441, 320; 375/377, 375/141, 146, 147, 148; 455/453, 450, 522, 455/452, 422, 526, 67.11, 68, 69, 422.1, 455/418–420, 423–425, 524, 525, 561, 515, 455/456.1, 456.2, 456.5
  See application file for complete search history.

(56) References Cited

U.S. PATENT DOCUMENTS

| | | | | |
|---|---|---|---|---|
| 5,070,536 A | * | 12/1991 | Mahany et al. | 455/67.14 |
| 5,422,940 A | * | 6/1995 | Endo et al. | 379/221.09 |
| 5,914,950 A | | 6/1999 | Tiedemann, Jr. et al. | |
| 6,067,458 A | * | 5/2000 | Chen | 455/522 |
| 6,137,840 A | * | 10/2000 | Tiedemann et al. | 375/297 |
| 6,240,079 B1 | * | 5/2001 | Hamalainen et al. | 370/337 |
| 6,388,997 B1 | * | 5/2002 | Scott | 370/280 |

(Continued)

FOREIGN PATENT DOCUMENTS

EP    1 033 846 A1    9/2000

(Continued)

OTHER PUBLICATIONS

Watanabe, S. et al. "Bit Error Rate Evaluation of Delay Time Control Scheme For Reverse channel on Orthogona Multi-Carrier CDMA", IEICE Transactions on Fundamentals of Electronics, Communications and Computer Sc Institute of Electronics Information and COMM. ENG. Tokyo, JP, vol. E80-A, No. 7, Jul. 1997, pp. 1226-1232.

*Primary Examiner* — Daniel J Ryman
*Assistant Examiner* — Jay P Patel
(74) *Attorney, Agent, or Firm* — Nixon & Vanderhye P.C.

(57) ABSTRACT

A radio network provides centralized load control in order to control uplink interference in a cell while at the same time permitting adaptation to fast channel variations. The radio network sends to a mobile terminal a percentage of time that the mobile terminal may transmit over a radio channel in the uplink direction to the radio network. The mobile determines a current or future condition of the radio channel and restricts uplink transmissions based on the received percentage and the radio channel condition. Transmissions are restricted to times when the current or future condition is favorable up to the percentage amount. Channel condition favorability may be determined by the mobile station, in one example embodiment, by comparing the radio channel condition to an average condition of the channel, such as a local or moving average channel condition. Also in an example embodiment, the mobile may determine a current or future channel condition using transmit power control commands received from the radio network.

34 Claims, 14 Drawing Sheets

U.S. PATENT DOCUMENTS

| | | | |
|---|---|---|---|
| 6,985,457 B2 * | 1/2006 | Zeira et al. | 370/318 |
| 6,985,523 B2 * | 1/2006 | Sims et al. | 375/232 |
| 6,985,739 B2 * | 1/2006 | Spaling et al. | 455/453 |
| 7,006,791 B2 * | 2/2006 | Buer | 455/13.4 |
| 7,076,523 B2 * | 7/2006 | Schneider et al. | 709/203 |
| 7,103,376 B2 * | 9/2006 | Takano et al. | 455/522 |
| 7,181,223 B1 * | 2/2007 | Pecen et al. | 455/452.1 |
| 7,236,474 B2 * | 6/2007 | Seo et al. | 370/329 |
| 7,333,450 B2 * | 2/2008 | Holma et al. | 370/328 |
| 7,373,151 B1 * | 5/2008 | Ahmed | 455/452.2 |
| 7,397,803 B2 * | 7/2008 | Love et al. | 370/395.4 |
| 2002/0022487 A1 | 2/2002 | Ahn | |
| 2002/0077111 A1 * | 6/2002 | Spaling et al. | 455/453 |

FOREIGN PATENT DOCUMENTS

| | | |
|---|---|---|
| EP | 1063805 | 12/2000 |
| WO | WO 01/03357 | 1/2001 |

* cited by examiner

METHOD AND APPARATUS FOR UPLINK TRANSMISSION TIMING IN A MOBILE COMMUNICATIONS SYSTEM

TECHNICAL FIELD

The present relates to radio communications, and more particularly, to a novel and improved method and apparatus for timing uplink transmissions from a mobile station.

BACKGROUND AND SUMMARY

In cellular communications systems, the mobile radio station communicates over an assigned radio channel with a radio base station. Several base stations are coupled to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station and establishes a radio communications channel. A call originated by the mobile station follows a similar path in the opposite direction.

Due to the rapid expansion of wireless mobile communications and the need for wideband multimedia services, there is a continuing need to better utilize the available frequency bandwidth. A common strategy in Frequency Division Multiple Access (FDMA)/Time Division Multiple Access (TDMA) systems is to reuse the frequencies in the network. The challenge with frequency reuse is to counteract or at least reduce the interference between transmitters in the system using the same frequency by controlling the transmit power levels of the radio signals and by separating to the extent practical the transmitters by a sufficient geographic distance. The transmit power levels of the mobile stations and base stations are ideally lowered so that only the minimum transmission power necessary to maintain satisfactory call quality is used. By reducing mobile and base station transmission power, the other radio communicators experience lower interference which means that the system capacity may be increased.

In a Code Division Multiple Access (CDMA) mobile communication system, spreading codes are used to distinguish information associated with different mobile stations or base stations transmitting over the same radio frequency band—hence the term "spread spectrum." In other words, individual radio "channels" are discriminated upon the basis of these codes. Because all users of a CDMA communications system transmit information using the same frequency band at the same time, each user's communication interferes with the communications of the other users. In addition, signals received by a base station from a mobile station close to the base station are much stronger than signals received from other mobile stations located at the base station's cell boundary. As a result, distant mobile communications may be overshadowed and dominated by close-in mobile stations.

Interference is a particularly severe problem in CDMA systems. If one mobile station transmits at a power output that is too large, the interference it creates degrades the signal-to-interference ratio (SIR) of signals received from other mobile radios to the point that a receiving base station cannot correctly demodulate transmissions from the other mobile radios. In fact, if a mobile station transmits a signal at twice the power level needed for the signal to be accurately received at the base station receiver, that mobile's signal occupies roughly twice the system capacity as it would if the signal were transmitted at the optimum power level. Unregulated, it is not uncommon for a "strong" mobile station to transmit signals that are received at the base station at many, many times the strength of other mobile transmissions. Such a loss of system capacity to excessively "strong" mobile stations is unacceptable.

Additional problems are associated with excessive transmit power. One is the so-called "party effect." If a mobile transmits at too high of a power level, the other mobiles may increase their respective power levels so that they can "be heard," compounding the already serious interference problem. Another problem is wasted battery power. It is very important to conserve the limited battery life in mobile radios. The major drain on a mobile's battery occurs during transmission. A significant objective for any power control approach, therefore, is to reduce transmit power where possible.

Most radio transmit power control procedures try to keep the signal strength and/or quality of the signal detected by a receiver above a desired threshold without using unnecessarily high transmit power. Because power control is so important, CDMA systems employ a relatively high sampling rate for the power control algorithm, e.g., 1500 times per second. To minimize overhead control signaling, only one bit is used to communicate power control adjustments to the radio transmitter. The power is stepwise increased or decreased based upon a comparison of received signal strength, or some other signal parameter, with a threshold. The receiver controls the transmitter's power by issuing transmit power control commands (TPCCs)—power up or power down—at the same high sampling rate (e.g., once every 0.667 msec) based on signal quality measurements, e.g., signal-to-interference ratio (SIR). If the measured signal parameter value is less than a target signal parameter value, the power-up command is issued; otherwise, the power-down command is issued. The radio transmitter responds to the power control commands by increasing or decreasing its transmit output power level P, for example, by a certain incremental power step $\Delta$, i.e., $P \leftarrow P+\Delta$ or $P \leftarrow P-\Delta$.

Because a power-up or a power-down command issues every 0.667 msec, the transmit power level is never constant or static. Accordingly, even in an ideal radio environment, the incremental power control commands continually alternate between power up and power down so that the transmit power level and the received signal quality oscillate up and down an incremental step around a target value. In order to maintain the quality of the received signal always above a prescribed limit, the target value needs to be set slightly higher than that limit so that the received signal quality after the power down step is still above the prescribed limit.

Uplink capacity is limited by a maximum, acceptable level of uplink interference. Uplink interference depends on the current uplink traffic load, movement of the mobile station (mobility), and current radio conditions. Traffic load can vary considerably and rapidly, especially with multimedia and other "bursty" data services. Mobility and changing radio-wave propagation conditions affect the quality of communications channels, and thus, the proper power level needed to transmit over those channels.

FIG. 1 shows a mobile communications environment with multiple, direct and indirect radio signals between base stations and mobile stations. FIG. 2 illustrates that the overall signal strength of a received signal varies as the distance between the transmitter and the receiver and depends (in one well-established model) on three variable factors: path loss, shadowing, and multipath fading. Path loss is the overall decrease in the field strength of the transmitted signal as the distance between the transmitter and the receiver increases. Shadowing occurs as a result of obstructions between the transmitter and receiver such as buildings, trees, and other objects in the environment. Multipath fading occurs as a result of constructive and destructive interference between multiple waves (rays) reaching the receiver from the transmitter. Multipath fading is particularly troubling because the quality of the received signal varies so rapidly.

In light of these obstacles, there is a need to dynamically control uplink interference so that satisfactory service is provided and maximum capacity is achieved. One way to control uplink interference is to assign maximum bit rates to mobile transmitters based on the current uplink interference load. But maximum bit rates do not adapt to changing conditions. Moreover, when most or all mobiles are transmitting at their maximum bit rate, there will be a spike in the uplink load perhaps causing less than satisfactory service. At other times, many of the mobiles may not transmitting at all, or at less than maximum bit rate, causing a dip in the uplink load and unused capacity.

Another approach is to limit the amount of time that mobiles can transmit in the uplink direction. A mobile station transmitting only 50% of the time generates less interference than when transmitting 100% of the time. One way to implement time-limited transmission is to assign each mobile station a probability of transmission and have each mobile transmit in a random fashion to meet this probability. EP 1033846 A1 describes broadcasting access probabilities to mobiles. Each mobile compares a random number to the probability. Uplink transmission occurs only when the random number is less than the broadcast probability.

Although this approach statistically reduces the uplink load, its randomness means that there is no attempt to transmit at particular times and not at others. As a result, the random time chosen to transmit may very well correspond to a time when radio transmission conditions are unfavorable, e.g., during a fading dip or when the current uplink load is momentarily high. An unfavorable condition means that the mobile must increase its transmit power, if possible, causing increased battery drain and interference or decreased signal quality at the base station.

These problems are overcome by limiting the amount of time that a mobile station can transmit and timing transmissions so they occur during favorable channel conditions rather than during less favorable channel conditions. Transmitting during favorable channel conditions requires less power, which translates into lower battery consumption and less interference to other uplink transmissions. Transmitting during favorable channel conditions also means fewer bit errors in received transmissions. Less uplink interference translates into a reduced uplink traffic load and more uplink capacity. If desired, the additional capacity may be used to allow mobile terminals to transmit at higher bit rates than would otherwise be permitted/possible in unfavorable channel conditions.

Having the mobile terminals transmitting during favorable channel conditions is particularly beneficial because fast channel variations due to constructive and destructive multipath fading are typically uncorrelated between mobile stations. If mobile stations only transmit during constructive fades (rather than during destructive fades), a higher instantaneous bit rate can be used to maintain the same average bit rate as when transmitting continuously. Because fading is uncorrelated between the transmitting mobiles, the number of simultaneously transmitting mobile stations will, on average, decrease. In this way, interference is reduced.

The radio network provides centralized load control in order to control and limit uplink interference in a cell while at the same time permitting adaptation to fast channel variations. The radio network sends to a mobile terminal a percentage of time that that mobile terminal may transmit over a radio channel in the uplink direction to the radio network. The mobile determines a current or future condition of the radio channel and restricts uplink transmissions based on the received percentage and the radio channel condition. Transmissions are restricted to times when the current or future condition is favorable, up to the percentage amount. Favorability may be determined by the mobile station, in one example embodiment, by comparing the radio channel condition to an average condition of the channel, such as a local or moving average channel condition.

Based on the load for the overall cell, an activity factor corresponding to a fraction or percentage is determined for each of the mobile terminals. The activity factor defines an amount of time relative to a total time that the mobile terminal may transmit based upon desired uplink load level for the cell area. The activity factors need only be sent to the mobile terminals infrequently thereby keeping the signaling load low. Activity factors could be sent more frequently, if desired, depending upon changing load conditions. Moreover, one activity factor may be assigned to a group of mobiles or to all mobiles in a specific cell, group of cells, or even in an entire radio network. Broadcasting group-specific, cell-specific, and network-specific activity factors reduces signaling. In any event, the mobile terminals are permitted to implement an appropriate algorithm to determine the best times to transmit when favorable channel conditions are present for that particular mobile terminal.

Information regarding the current or future condition of the radio channel is provided, in an example, non-limiting embodiment, from the radio network, preferably at a high frequency. Because transmit power control commands (TPCCs) are sent from the radio network very frequently already, TPCCs are advantageously used by the mobile terminals, in a preferred example embodiment, to determine when favorable channel conditions exist or will exist. One of the benefits of using TPCCs is that the radio network can control the uplink load without having to send additional control signaling messages to each of the mobile terminals to indicate when each mobile terminal should transmit and when it should stop transmitting.

One example algorithm that uses TPCCs to determine channel conditions calculates a cumulative transmit power control command (CPTCC) value. The network provides an activity factor used to determine a transmit threshold. The cumulative TPCC value is compared to the transmit threshold, and the determination of when to transmit is based on the comparison. When the percentage of allowed transmit time is higher, the transmit threshold is higher, and when the percentage is lower, the transmit threshold is lower.

Because transmissions occur during favorable channel conditions when there is less interference and because those favorable channel conditions are not correlated between different channels, the overall uplink cell interference level decreases. This permits the mobiles to increase their bit rate up to a preset maximum, if desired, or conserve battery power. If the interference level is reduced, the cell capacity increases. These advantages are not achieved when transmissions are timed randomly.

DETAILED DESCRIPTION

In the following description, for purposes of explanation and not limitation, specific details are set forth, such as particular embodiments, procedures, techniques, etc. However, it will be apparent to one skilled in the art that other embodiments that depart from these specific details may be practiced. For example, while a description is provided in the context of an example application to GFRS/UMTS systems, the technolgy described here may be employed in any cellular radio system.

In some instances, detailed descriptions of well-known methods, interfaces, devices, and signaling techniques are omitted so as not to obscure the description with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
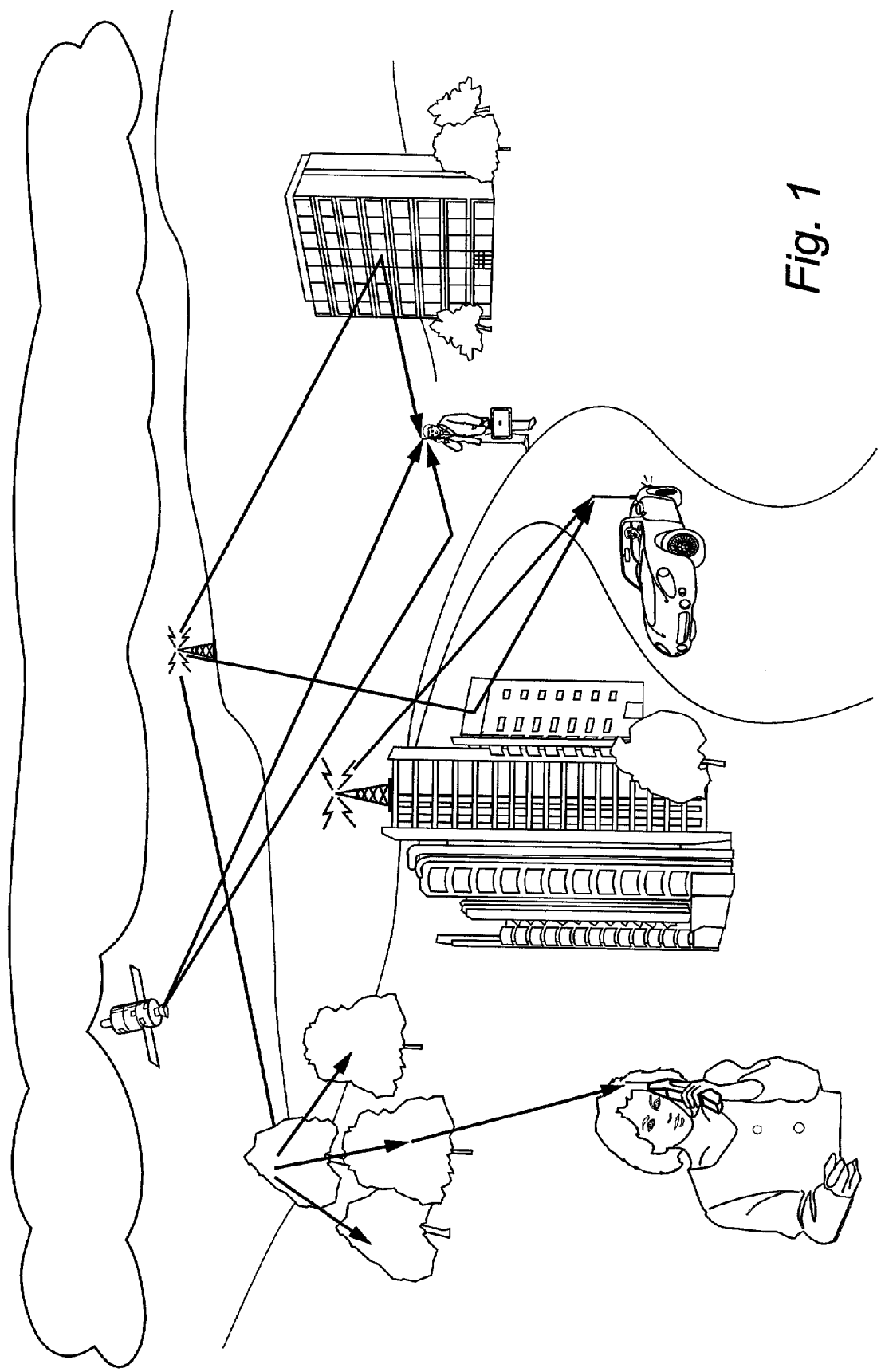
FIG. 1 illustrates a wireless propagation environment showing various interactions within that environment.
Figure 2:
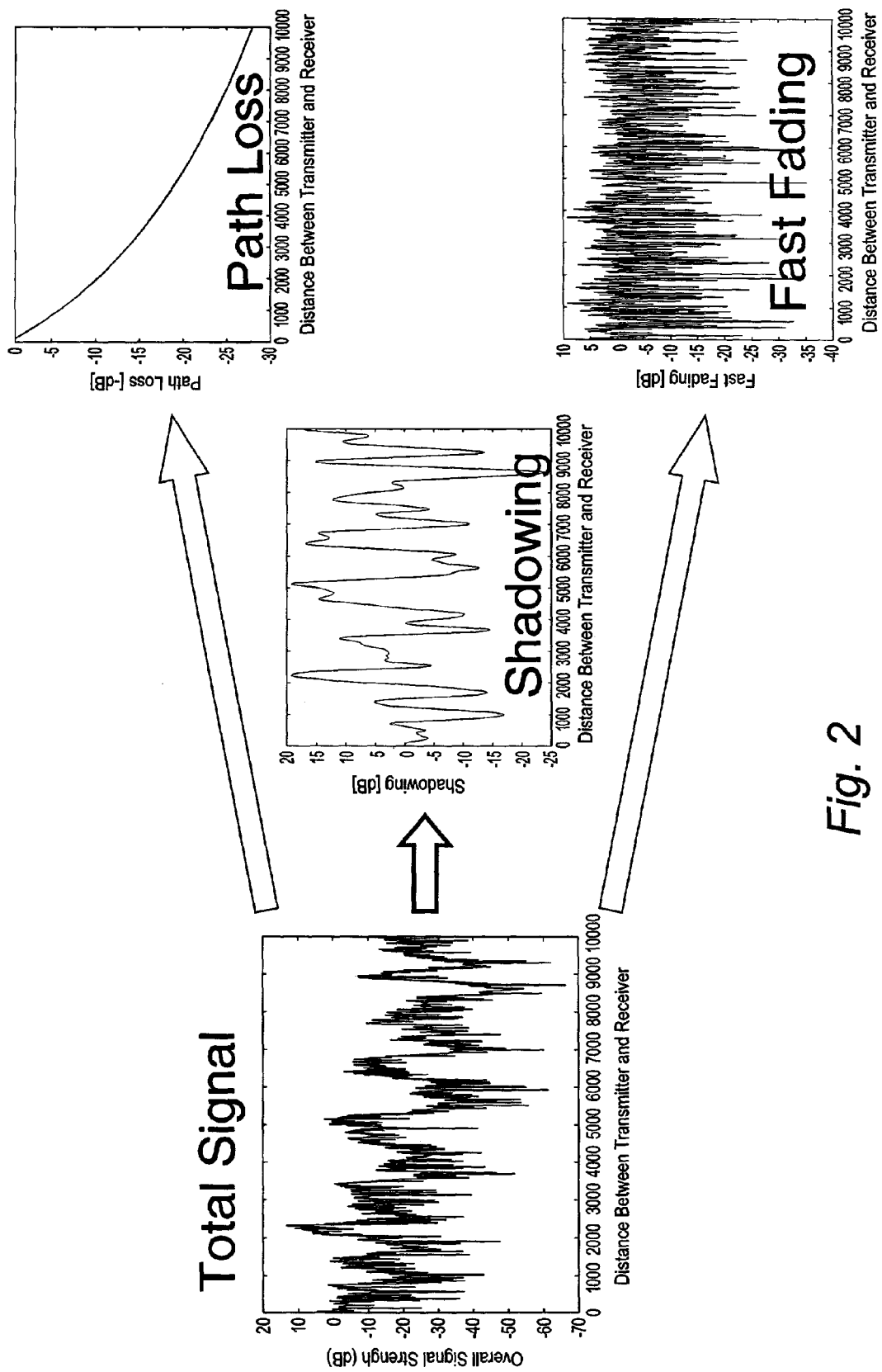
FIG. 2 shows different causes of mobile signal variation in the environment illustrated in FIG. 1.
Figure 3:
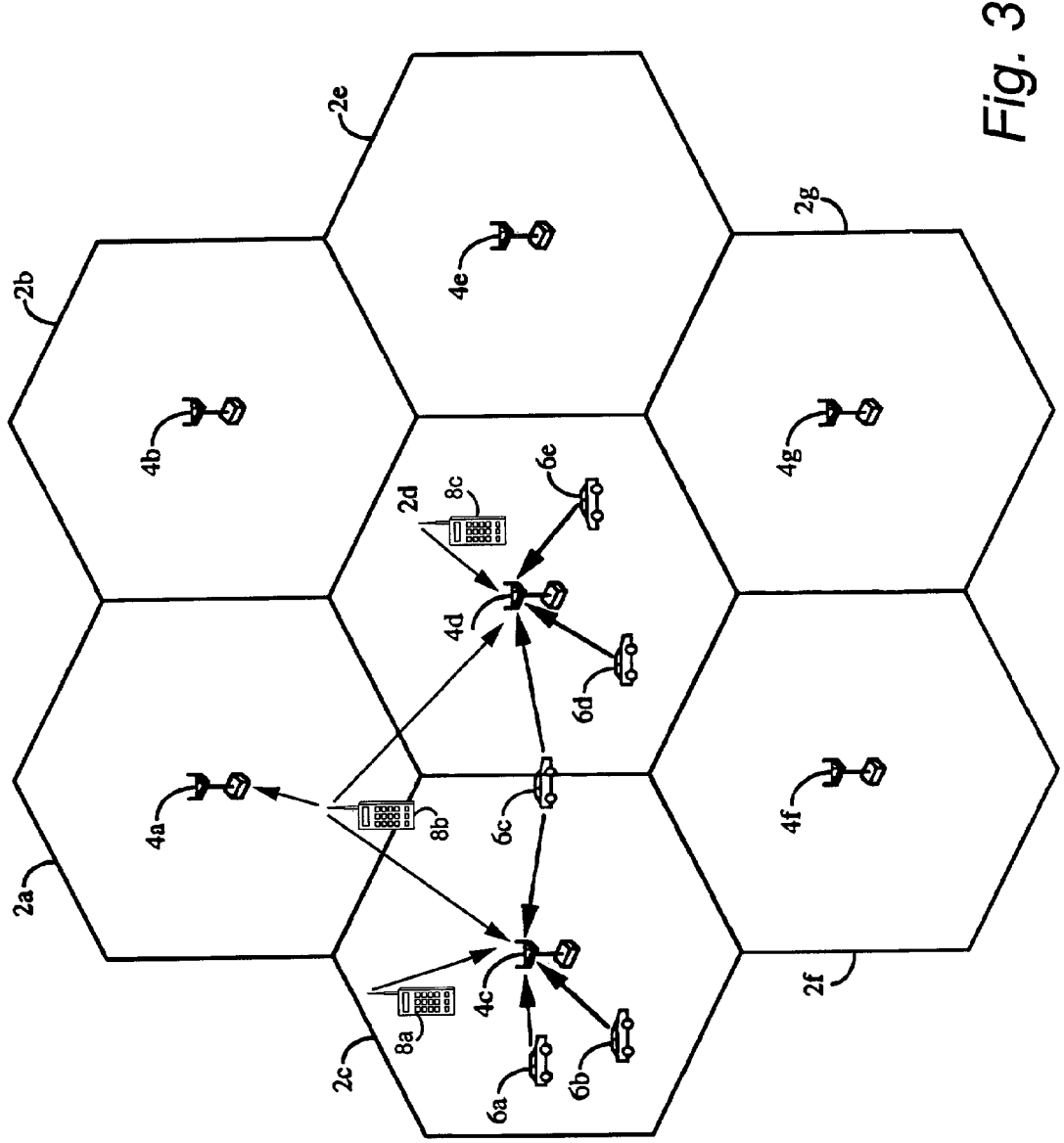
FIG. 3 is a diagram of a cellular network comprising a plurality of cells, a plurality of base stations, and a plurality of mobile terminals.

FIG. 3 represents an example cellular communication network composed of multiple cells 2a-2g. Each cell 2 is serviced by a corresponding base station 4. In the example embodiments, the cellular network is a CDMA communications network, although the present invention is applicable to all wireless communication formats. Within the CDMA network, various mobile stations 6 are dispersed throughout the cells. Each mobile station 6 communicates with one or more base stations 4. For example, mobile stations 6A and 6B communicate exclusively with base station 4C, but remote station 6C, which is located near a cell boundary is in soft handover, communicates simultaneously with base stations 4C and 4D.

Figure 4:
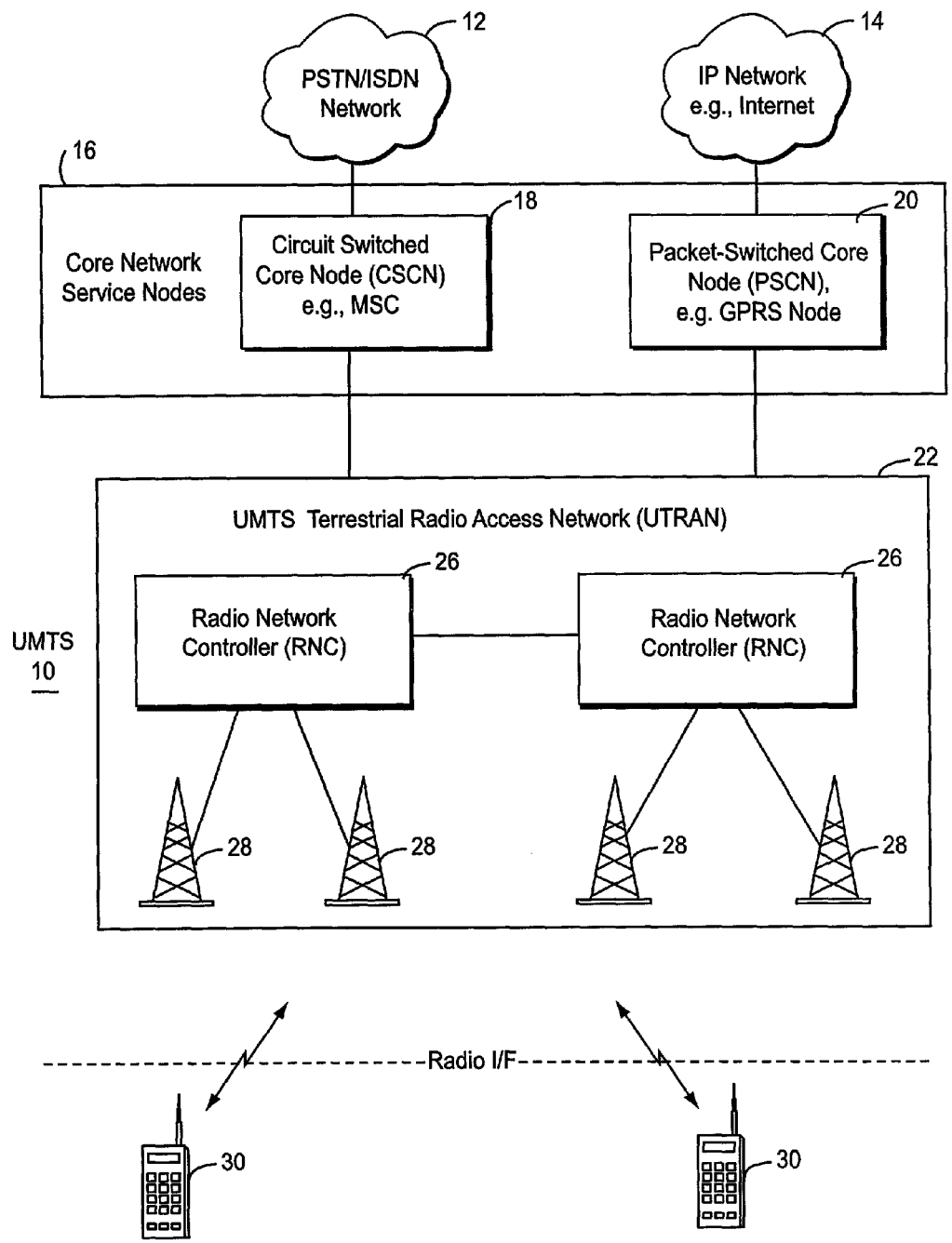
FIG. 4 illustrates in function block form a UMTS type radio communication system.

One example, non-limiting cellular communications environment may be employed is in the context of a Universal Mobile Telecommunication System (UMTS) 10 shown in FIG. 4. A representative, circuit-switched core network, shown as a cloud 12, may be for example the Public Switched Telephone Network (PSTN) or the Integrated Services Digital Network (ISDN). A representative, packet-switched core network, shown as a cloud 14, may be for example an IP network like the Internet. Both core networks are coupled to corresponding core network service nodes 16. The PSTN/ISDN circuit-switched network 12 is connected to a circuit-switched service node shown as a Mobile Switching Center (MSC) 18 that provides circuit-switched services. The packet-switched network 14 is connected to a General Packet Radio Service (GPRS) node 20 tailored to provide packet-switched type services.

Each of the core network service nodes 18 and 20 connects to a UMTS Terrestrial Radio Access Network (UTRAN) 24 that includes one or more Radio Network Controllers (RNCs) 26. Each RNC is connected to a plurality of Base Stations (BS) 28 and to any other RNCs in the UTRAN 22. Radio communications between the base stations 28 and Mobile Terminals (MT) or stations 30 are by way of a radio interface. Radio access is based on Wideband-CDMA (W-CDMA) with individual radio channels distinguished using CDMA codes. Wideband CDMA provides wide radio bandwidth for multiple media services including packet data applications that have high data rate/bandwidth requirements.

Figure 5:
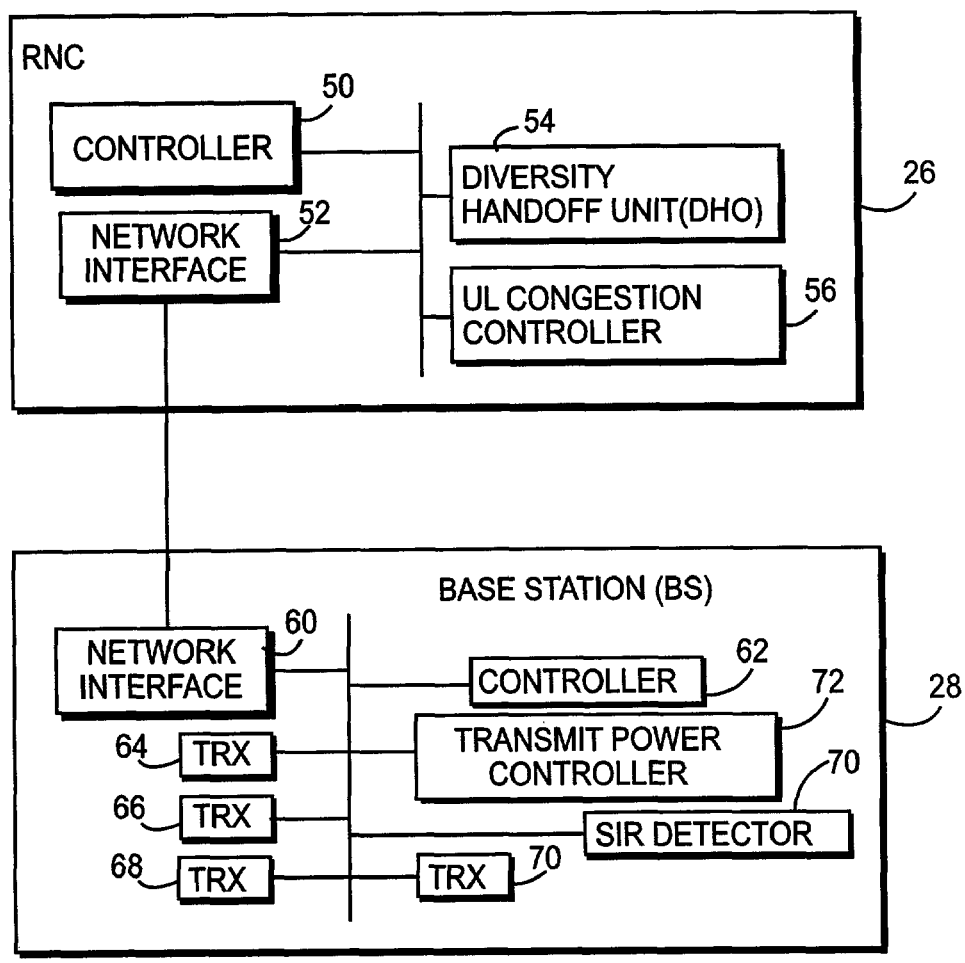
FIG. 5 is a function block diagram of a radio network controller and a base station illustrated in FIG. 4.

Additional details of a base station 28 and a radio network controller 26 are described in conjunction with FIG. 5. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections such as diversity combining, diversity splitting, power control and other link related radio resource control algorithms.

An uplink congestion controller 56 monitors the uplink load in each cell using measurement reports provided by each base station. Based on these measurements, the controller 56 determines load and congestion control parameters including a desired uplink load per cell, an activity factor for each mobile station or for a group of mobiles characterized by connected cell, service, subscription, or other parameter specified by the network operator, a maximum average bit rate, a maximum transmit power level, maximum momentary bit rate, etc. The activity factor indicates a fraction (0-1) or a percentage (0-100%) of time that the mobile station is permitted to transmit.

The activity factors may be determined individually for each mobile station, they may be grouped, or they may be all the same. One non-limiting, example way of determining the activity factor in the network in the context of soft handover is as follows:

If the current load L (such as the uplink interference) is above a load threshold $L_{max}$, decrease the activity factor either by a pre-defined step, or by a step related to $(L-L_{max})$.

If the current load is below a threshold $L_{min}$, increase the activity factor either by a predefined step, or by a step related to $(L_{min}-L)$.

If $L_{min}<L<L_{max}$, then the activity factors are not adjusted. When in soft handover, the mobile may receive activity factors from two or more base stations. In that case, the mobile only considers the lowest activity factor among those received. To avoid the effects of transmission errors in control signaling, the mobile may only consider activity factors that were received with an acceptable quality.

Regardless of how an activity factor is determined, uplink load may be regulated by vang the activity factor, i.e., a lower activity factor reduces the load, and a higher activity factor increases the load. The RNC 26 communicates the activity factors to the mobile stations via base station transmissions, such as over a broadcast or other control channel. The frequency of communication can be high, low, or only once at the time a connection is established, depending on the degree of load control desired.

Each base station 28 includes a corresponding network interface 60 for interfacing with the RNC 26. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64-70 are individually assigned to specific communications with mobile stations. At least one transceiver is employed as a common control channel over which the base station transmits common signaling such as pilot, synchronization, or other broadcast signaling. Mobile stations within or near the base station's cell(s) monitor the common channel.

Transmit power controller 72 performs uplink power control operations including providing uplink channel quality measurements to the uplink congestion controller 56 in the RNC 26. Although the uplink load control and activity factor determination is disclosed as being performed by the RNC 26, it may also be performed by the BS 28 if desired. One or more signal-to-interference ratio (SIR) detectors 74 (only one is shown for purposes of illustration) may be used to detect the SIR of signals received from mobiles. Other signal quality detectors may be employed, e.g., CIR, RSSI, etc. The transmit power controller also sends transmit power control commands (TPCCs) to each mobile terminal to either increase or decrease uplink transmit power. These TPCCs effectively convey the current quality of the uplink channel to the mobile station.

Although the following description uses TPCCs as an example, the current or future channel condition may be communicated to the mobile station using other types of signals. It may be desirable to send a prediction or estimation of a future condition of the uplink channel so that by the time the mobile station is deciding whether the channel condition is favorable, the mobile will have relatively "current" channel condition information. Predicted signal quality may be especially useful when the frequency of communication of channel conditions is lower.

Figure 6:
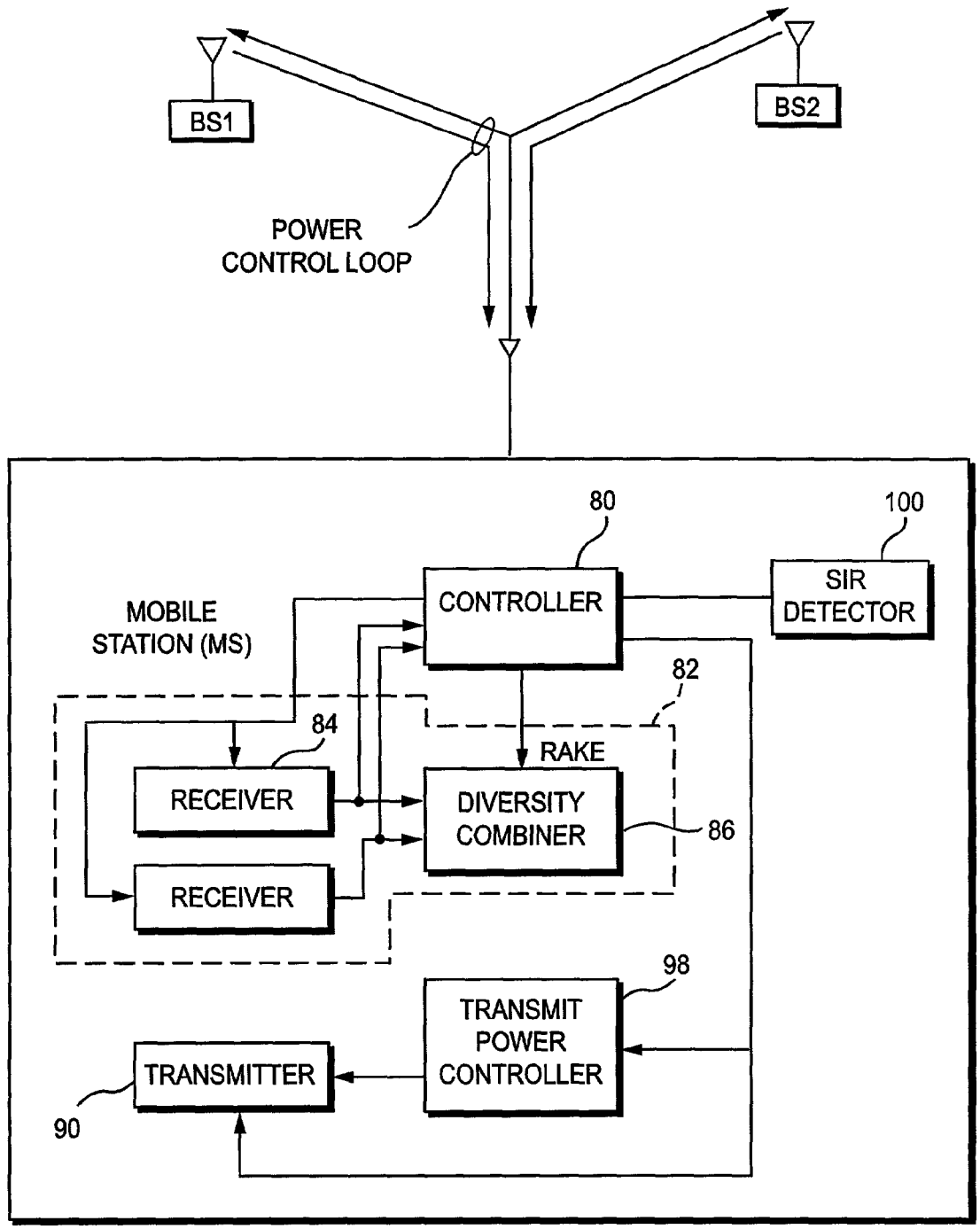
FIG. 6 is a function block diagram of a mobile station shown in FIG. 4 as well as a power control loop.

FIG. 6 illustrates additional details of a mobile station shown in FIG. 5. The mobile station includes a controller 80 connected to a RAKE receiver 82, a transmit power controller 88, a transmitter 90, and a SIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combining diversity combiner 86 and processed as one signal. Transmit power controller 88 determines the transmit power level (preferably as a signal-to-interference ratio (SIR)) of the received, diversity-combined signal.

FIG. 6 also shows a power control loop between the mobile station and two base stations BS1 and BS2. Based upon SIR measurements of a received signal, the mobile station generates transmit power control commands sent to the base stations BS1 and BS2. As described above, the base stations BS1 and BS2 send transmit power control commands (TPCCs) to the mobile station based on SIR measurements made of signals received from that mobile station. The TPCCs include one or more bits indicating an increase in transmit power or a decrease in transmit power. Of course, any number of bits or bit assignments may be used. Alternatively, an actual transmit power level value may be sent. In order to compensate for rapidly changing transmission conditions, the SIR measurements and resulting transmit power control commands are generated very frequently, and in one example embodiment, every 0.667 millisecond time slot or 1,500 times a second. The mobile station transmit power controller 88 or controller 80 determines channel conditions using, for example, the TPCCs from the base station(s) and calculates favorable transmission times in accordance with an appropriate algorithm, examples of which are described below.

Apart from mechanisms such as admission control, congestion control, channel switching, etc., the uplink load in a cell is also managed from the network perspective by providing each mobile station with an activity factor or other parameter that indicates a fraction or percentage of time that the mobile station may transmit on the uplink. The uplink load is further controlled by each mobile station selectively transmitting only when the uplink channel conditions are favorable. The mobile station schedules its transmissions for those times when its uplink channel condition is favorable, e.g., during a constructive fade, and does not transmit when its channel condition is unfavorable, e.g., during a destructive fade.

This selective transmission has several benefits. First, by transmitting when the channel condition is favorable, less power is needed to ensure satisfactory reception at the base station, i.e., signals received with a low bit error rate (BER). Second, because the rapid channel variations due to fast fading are typically uncorrelated between mobile stations, if each mobile station only transmits during those times when its channel condition is favorable, the number of simultaneously transmitting mobile stations will, on average, decrease thereby reducing interference in the cell.

Figure 7:
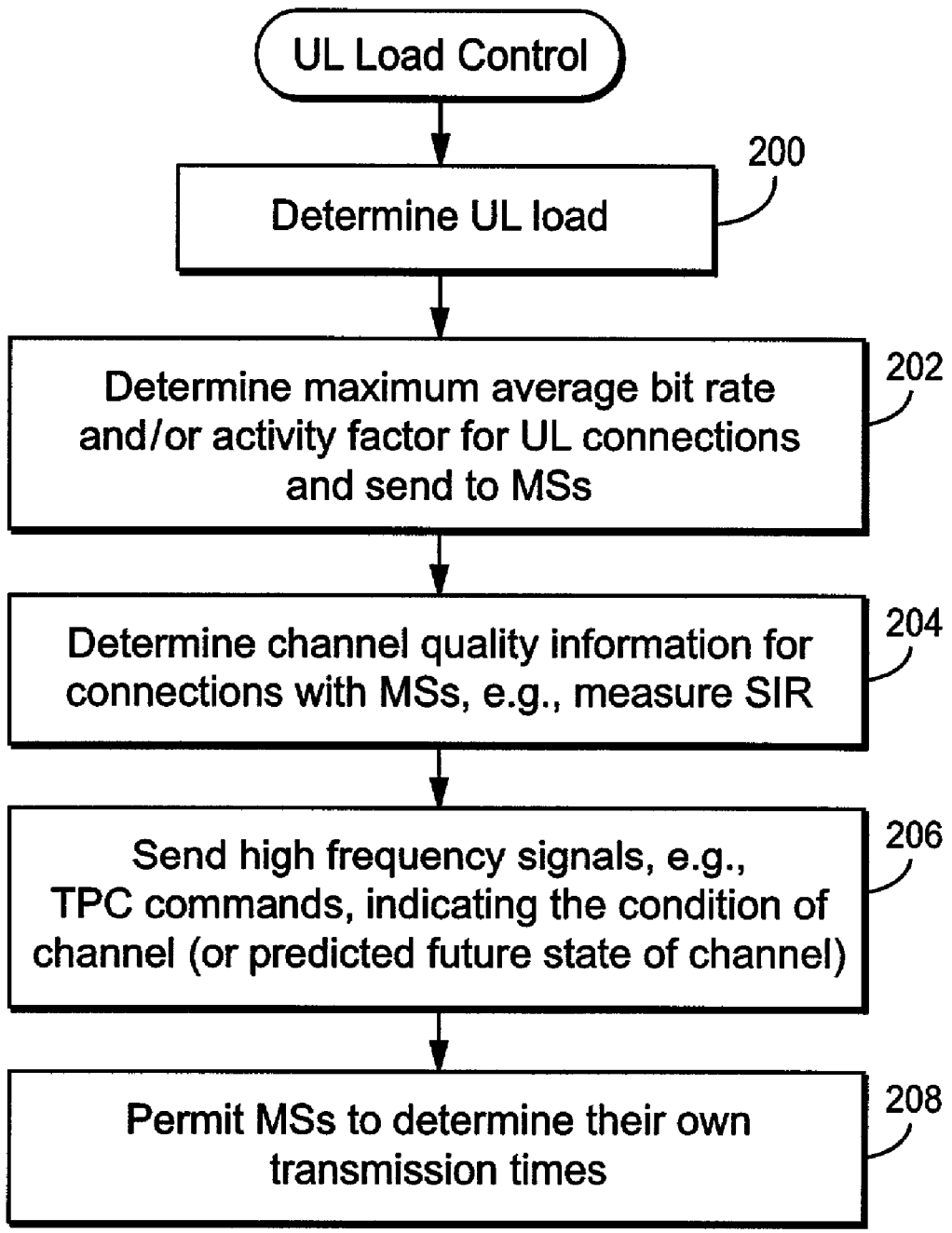
FIG. 7 is an uplink load control routine illustrating in flowchart form example procedures.

Reference is now made to the Uplink (UL) Load Control routine illustrated in flowchart form in FIG. 7. This routine is performed by the radio network using the uplink congestion controller 56, the base station power controller 72, and SIR detector 70. Of course, the uplink load control could be performed exclusively by the RNC or by the base station if desired. The radio network determines the uplink load for the cell (block 200). The network determines a maximum average bit rate (optional) and/or an activity factor for active uplink connections and sends that information to the corresponding mobile stations (block 202). These parameters may be static or they may be updated periodically.

Channel quality information for each of the active uplink connections is determined based on base station SIR measurements of the uplink received signals of the active uplink connections (block 204). The network radio sends to each active mobile station, at a relatively high frequency, signals indicating the condition of the channel from which the mobile station can determine a favorable or unfavorable condition (block 206). Alternatively, it may be desirable to provide a predicted/estimated future state of each uplink channel if channel condition information is not provided at a sufficiently high frequency. The mobile terminals determine their own transmission times based upon the activity factor and the channel condition information (block 208). Any suitable algorithm may be employed by the mobile terminal to determine those transmission times. One example transmission timing algorithm is to compare the CPTCC to $P_{filt\_new}$ as shown in FIG. 9B.

Figure 8:
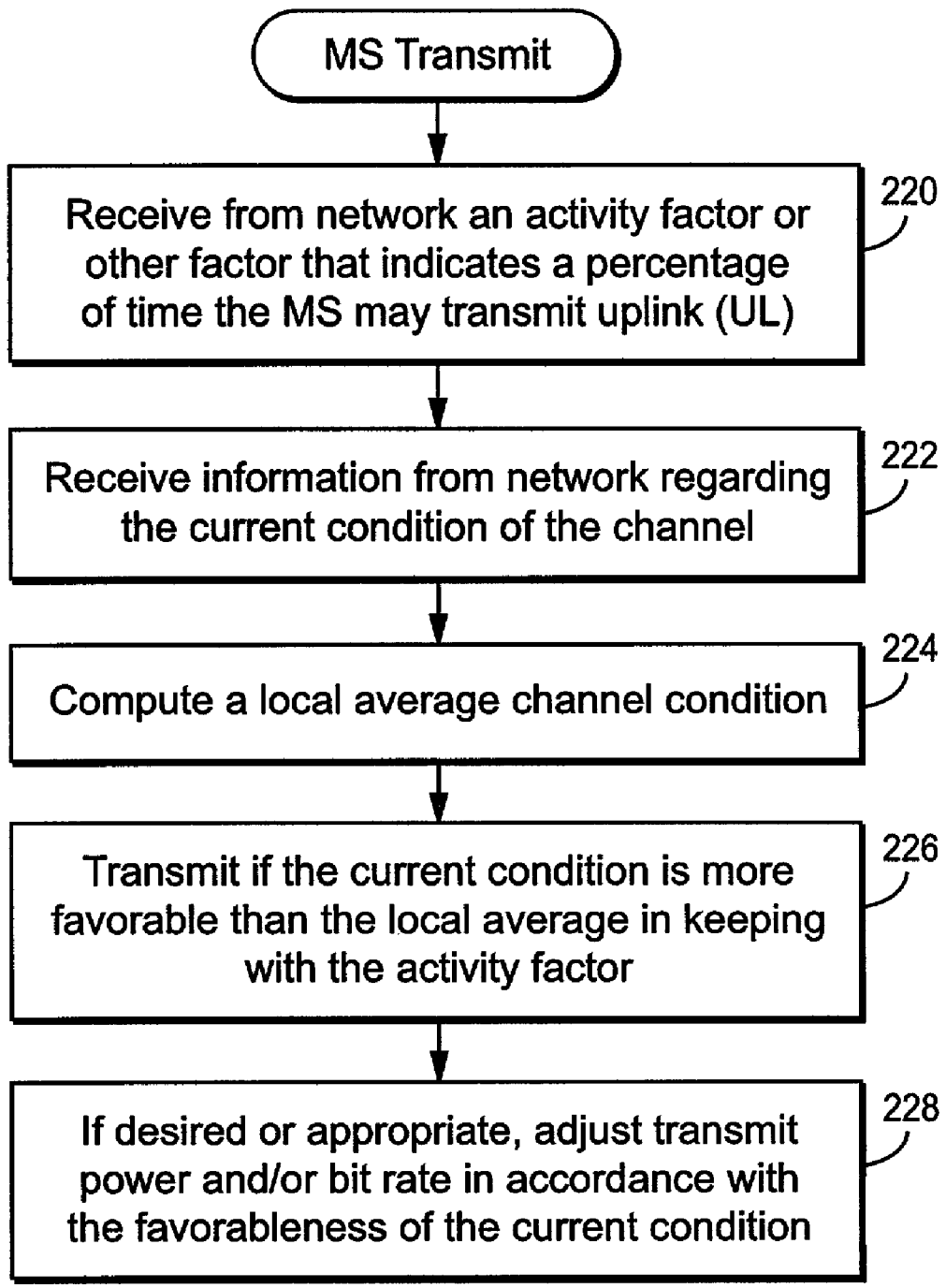
FIG. 8 is a mobile terminal transmit routine illustrating in flowchart form example procedures.

Reference is now made to the Mobile Station (MS) Transmit routine illustrated in flowchart form in FIG. 8. The mobile station receives from the radio network an activity factor or other parameter that indicates a fraction or a percentage of time the mobile station may transmit uplink (block 220). Assuming a percentage activity factor, one may be assigned by the base station or the uplink congestion controller in the RNC in the range of 0 to 100%. Other parameters could be used and may be assigned individually to mobile stations. Alternatively, the same activity factor may be used by all mobile stations in a group of mobiles, a cell, a group of cells, or even in a mobile network. When the activity factor is less than 1, a mobile station will only be permitted to transmit for a fraction of time. For example, if the activity factor is 50%, the mobile terminal may only transmit during favorable channel conditions half of the total amount of time during the life of the uplink connection.

The mobile station tries to transmit when the channel condition is more favorable and does not transmit during less favorable conditions. In order to determine the channel condition, the mobile station receives information from the radio network, (i.e., either from the RNC via the base station or directly from the base station), regarding the current condition of the uplink channel (block 222). The mobile computes a local average channel condition which functions as a transmission threshold (block 224). If the current condition is more favorable than the local average, the mobile station transmits in accordance with its assigned activity factor (block 226). If desired or otherwise appropriate, the mobile station may also adjust its uplink transmit power and/or bit rate to take advantage of the favorableness of the current channel condition (block 228). Since the channel condition is favorable, the transmit power of the mobile station can be reduced, if desired, or alternatively, the bit rate could be increased while keeping the transmit power the same. Reduced power levels save the mobile station battery, and increased bit rate improves the service received by the mobile station.

In order to track rapidly changing uplink channels, the mobile station must receive information regarding the current condition of the channel at a relatively high frequency. Rather than sending separate signals from the network to the mobile station, the mobile station can determine the current condition of the mobile station using the fast transmit power control commands (TPCCs) used in CDMA-type systems as described above. The TPCCs sent to the mobile station once every timeslot, e.g., 0.667 milliseconds, inform the mobile station whether the channel quality is increasing or decreasing. A TPCC of +1 means that the channel condition is deteriorating, and a TPCC of −1 means that the channel condition is momentarily improving. The mobile station can approximate the channel quality variations by monitoring a cumulative sum of the TPCCs (CTPCC):

$$CTPCC_{new} = CTPCC_{old} + TPCC_{current} * \Delta, \quad (1)$$

where $\Delta$ equals a step size. The CTPCC may be computed to a transmit threshold to determine when to transmit. One example of a transmit threshold is a local average of the channel condition. A higher CTPCC than the local average means a deteriorating channel, such as a destructive fade, and a lower CTPCC means an improving channel, such as a constructive fade.

In one example transmit timing embodiment, the mobile station transmits when the current channel condition is better than average. One way to determine a local average of the channel condition is to compute a low pass-filtered version of the CTPCC as follows:

$$P_{filt\_new} = \lambda * P_{filt\_old} + (1-\lambda) * CTPCC_{new} \quad (2)$$

where $\lambda$ is between 0 and 1. The mobile station transmits when $CTPCC_{new}$ is less than $P_{filt\_new}$. Transmitting only when $CTPCC_{new}$ is less than the average channel condition effectively results in an activity factor of 50%. Based on the favorableness of the current condition, the mobile may decide to transmit with an increased bit rate up to a maximum average bit rate, or maintain the bit rate at a lower power level because the interference is momentarily lower, thereby conserving battery power.

Figure 9A:
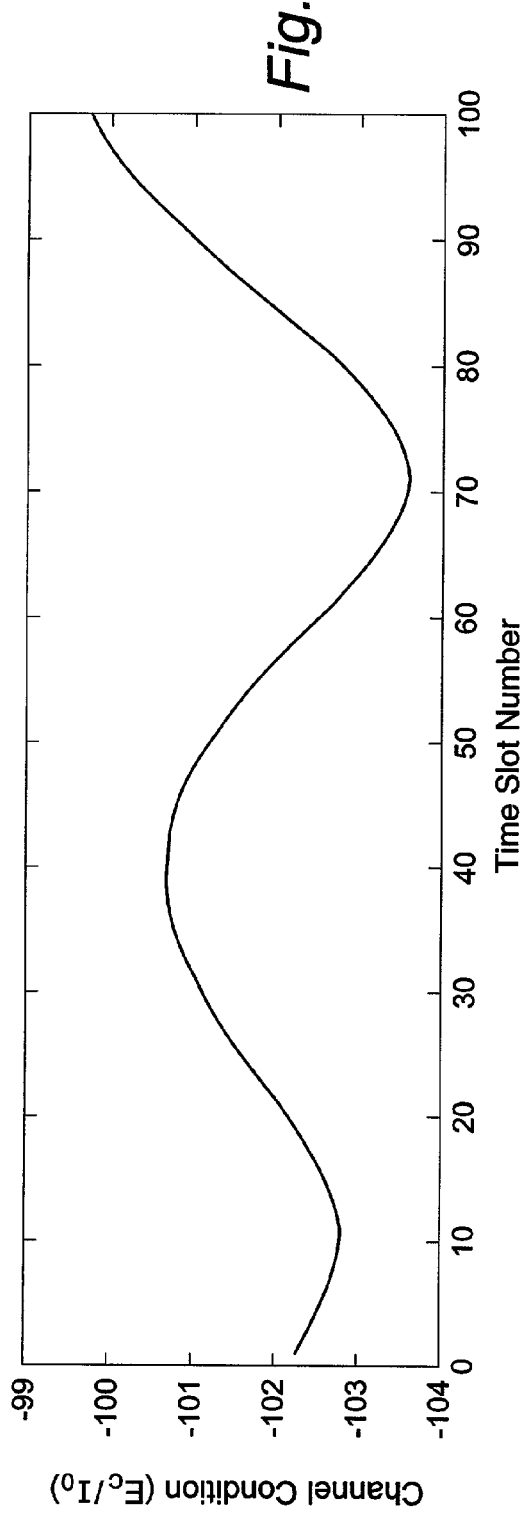
FIGS. 9A and 9B illustrate example graphs showing fading and corresponding cumulative sums of transmit power control commands, respectively.
Figure 9B:
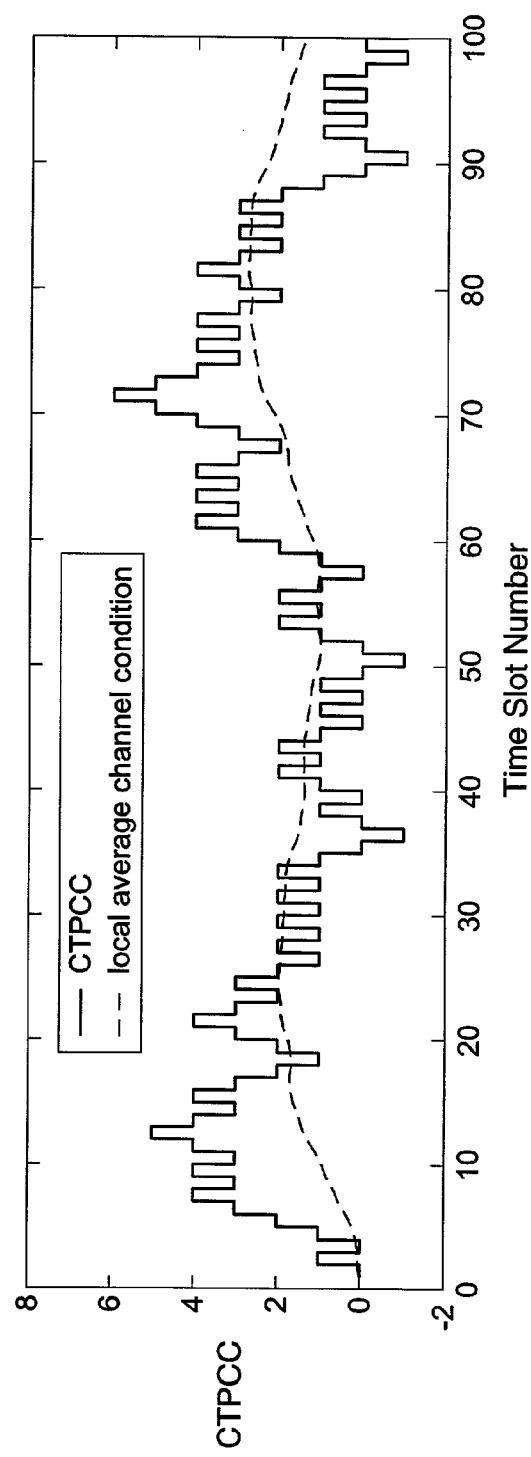

For an illustrative example relating to equation (2), reference is made to the graphs in FIGS. 9A and 9B. FIG. 9A shows the channel condition (the SIR is shown as $(E_c/I_o)$) relative to time measured by timeslot number. A first destructive fade is followed by a first constructive fade, followed by a second destructive fade, which followed by a second constructive fade. FIG. 9B is a graph illustrating the cumulative sum of the transmit power control commands received by the mobile station (CTPCC) compared to a local average channel condition, e.g., low pass-filtered CTPCCs as calculated using equation (2). By comparing the CTPCC to the local average channel condition, the mobile station can determine very rapidly whether to transmit. When the CTPCC is greater than the dotted line representing the local average channel condition, this generally corresponds to an unfavorable condition shown as a destructive fade in FIG. 9A. There would likely be no transmissions during this fade. However, when the CTPCC is less than the local average channel condition, as it generally is during the constructive fade in FIG. 9A, transmissions would likely occur during these favorable conditions. Similarly, as the second destructive fade occurs, the CTPCC exceeds the local average channel condition so that no transmissions occur.

Other example transmit timing embodiments preferably also take into account an activity factor in the transmission decision. The activity factor, and possibly other parameters, are used to compute a transmission threshold. The mobile transmits when the current channel condition, e.g., given by the CTPCC, is better than the threshold. Such a transmission threshold may be determined in a number of ways. Three examples follow.

One way is to compute the transmission threshold iteratively. The mobile monitors its current activity, activity_est, for the last T seconds. The transmission threshold is adjusted to a new value threshold_new using a previous value threshold_old and the activity factor af provided by the network. For example, the following algorithm may be used:

$$\text{threshold\_new} = \text{threshold\_old} + K(af - \text{activity\_est}), \quad (3)$$

where K is a positive constant between 0 and 1.

Figure 10:
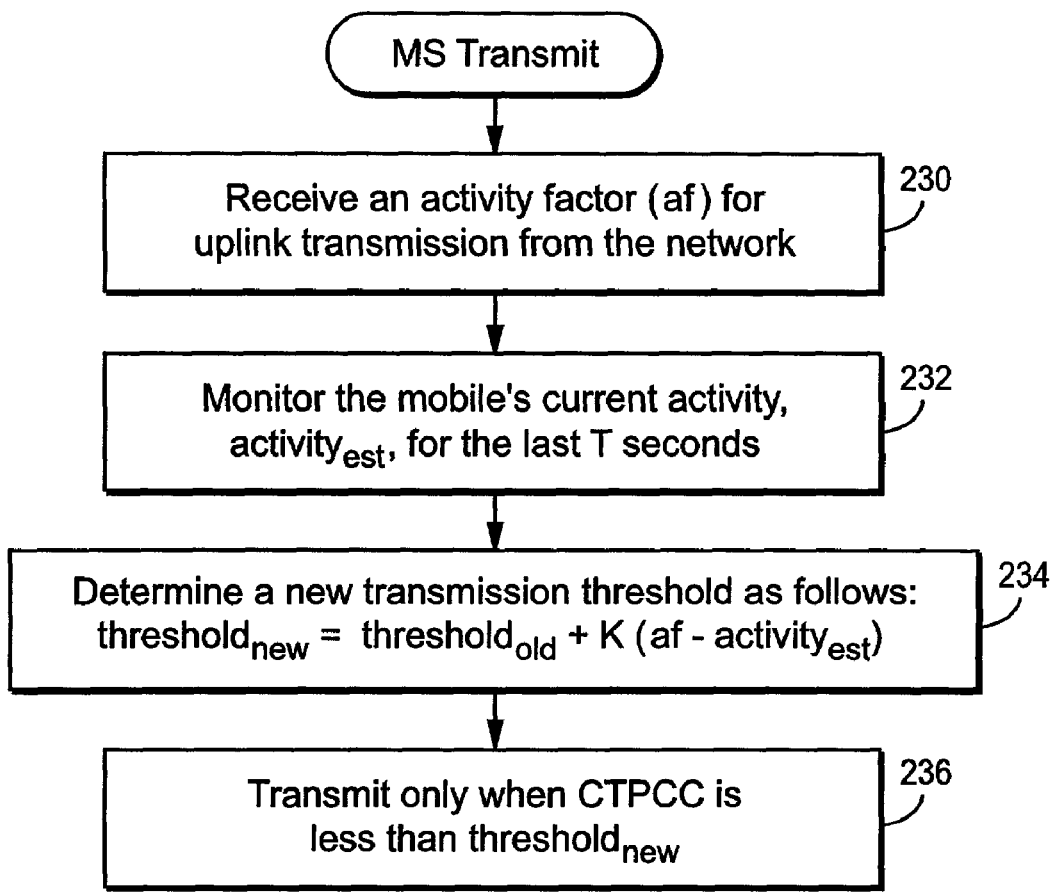
FIG. 10 is another mobile terminal transmit routine illustrating in flowchart form example procedures.

FIG. 10 is a flowchart entitled MS Transmit illustrating example steps for the mobile determining when to transmit based on equation (3). The mobile receives an activity factor (af) for uplink transmission presumably from the network (block 230). The mobile monitors its current transmission activity level, activity_est, for the last T seconds (block 232). A new transmission threshold is determined using equation (3). The mobile transmits only when the CTPCC is less than threshold_new.

Another way to determine transmit times uses the local average of the channel condition to compute a transmission threshold in accordance with the following:

$$\text{threshold} = \text{local avg.} + f(\text{af}), \quad (4)$$

where local avg. is the local average channel condition, (calculated for example using equation (2)), and $f(\text{af})$ is a function that accounts for the activity factor for this particular mobile station.

The activity function may also take into account both the activity factor and the activity estimate described above in equation (3). Three example $f(\text{af})$ functions are described. A first example $f(\text{af})$ function is based on the statistics of variations in the difference CTPCC−filtered CTPCC. If such statistics are known or may be gathered, e.g. to determine a cumulative distribution function (CDF), $$f_1(\text{af}) = \{CDF(CTPCC - \text{filtered } CTPCC)\}^{-1} \quad (5)$$

which can be rewritten as:

$$f_1(\text{af}) = \{P((CTPCC - \text{filtered } CTPCC) < \alpha)\}^{-1} \quad (6)$$

Figure 11B:
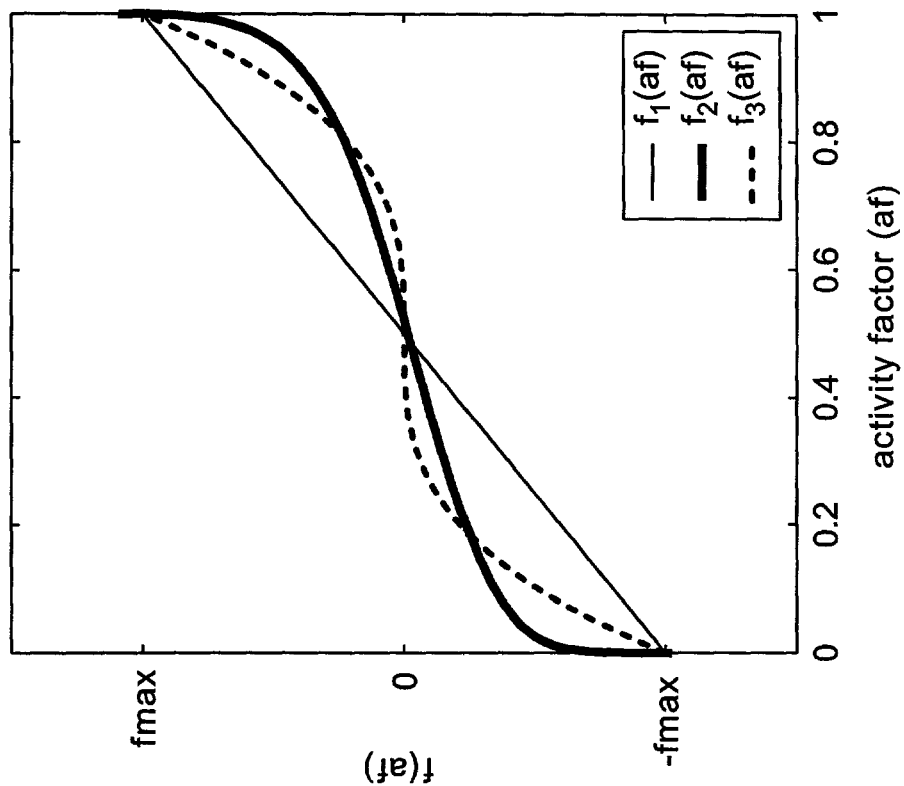
FIGS. 11A and 11B are graphs illustrating example activity factor functions for determining when to transmit from a mobile station.
Figure 11A:
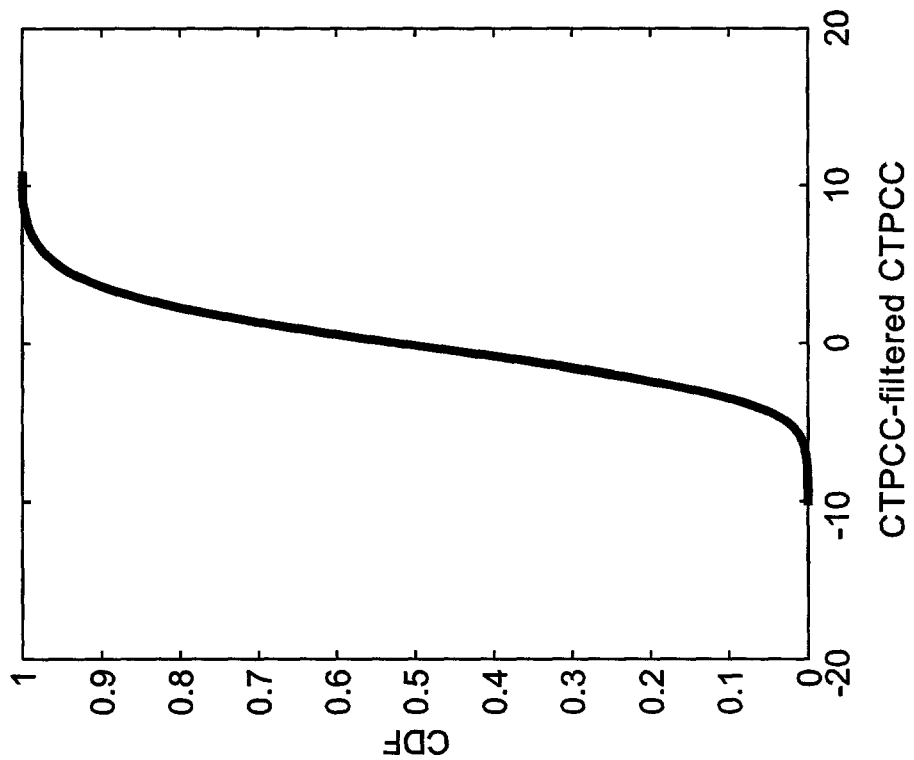

P is the probability that CTPCC−filtered CTPCC is less than a variable α. An example CDF is shown in FIG. 11A, and the corresponding activity factor function $f_1(\text{af})$ is shown as a thick black line in FIG. 11B. Because such statistics may not be known or readily obtained, the mobile may estimate the statistics. In this second example, the mobile estimate the CDF as in FIG. 11A, and that estimate is used to compute the activity function $f_1(\text{af})$.

A third example approach to generate an activity factor would be for the network to simply supply the mobile with a suitable activity function $f(\text{af})$. Two example activity functions $f_2(\text{af})$ and $f_3(\text{af})$ are given below and shown in FIG. 11B.

$$f_2(\text{af}) = f_{max} * 2 * (\text{af} - 0.5)) \quad (7)$$

$$f_3(\text{af}) = f_{max} * 8 * (\text{af} - 0.5)^3 * \text{sign}(\text{af} - 0.5) \quad (8)$$

where $f_{max}$ is a configurable parameter determining the span of $f_i(\text{af})$. The activity factor $f(\text{af})$ determined in any one of these three approaches (or other approaches) is used in equation (4) to calculate the transmission threshold.

Yet another way of determining a transmission threshold uses a local minimum and local maximum power level. The mobile monitors the local maximum CTPCC ($CTPCC_{max}$) and the local minimum CTPCC ($CTPCC_{min}$) over the last T seconds. The threshold is calculated using the following equation:

$$\text{threshold} = CTPCC_{min} + \text{af} * (CTPCC_{max} - CTPCC_{min}) \quad (9).$$

Figure 12:
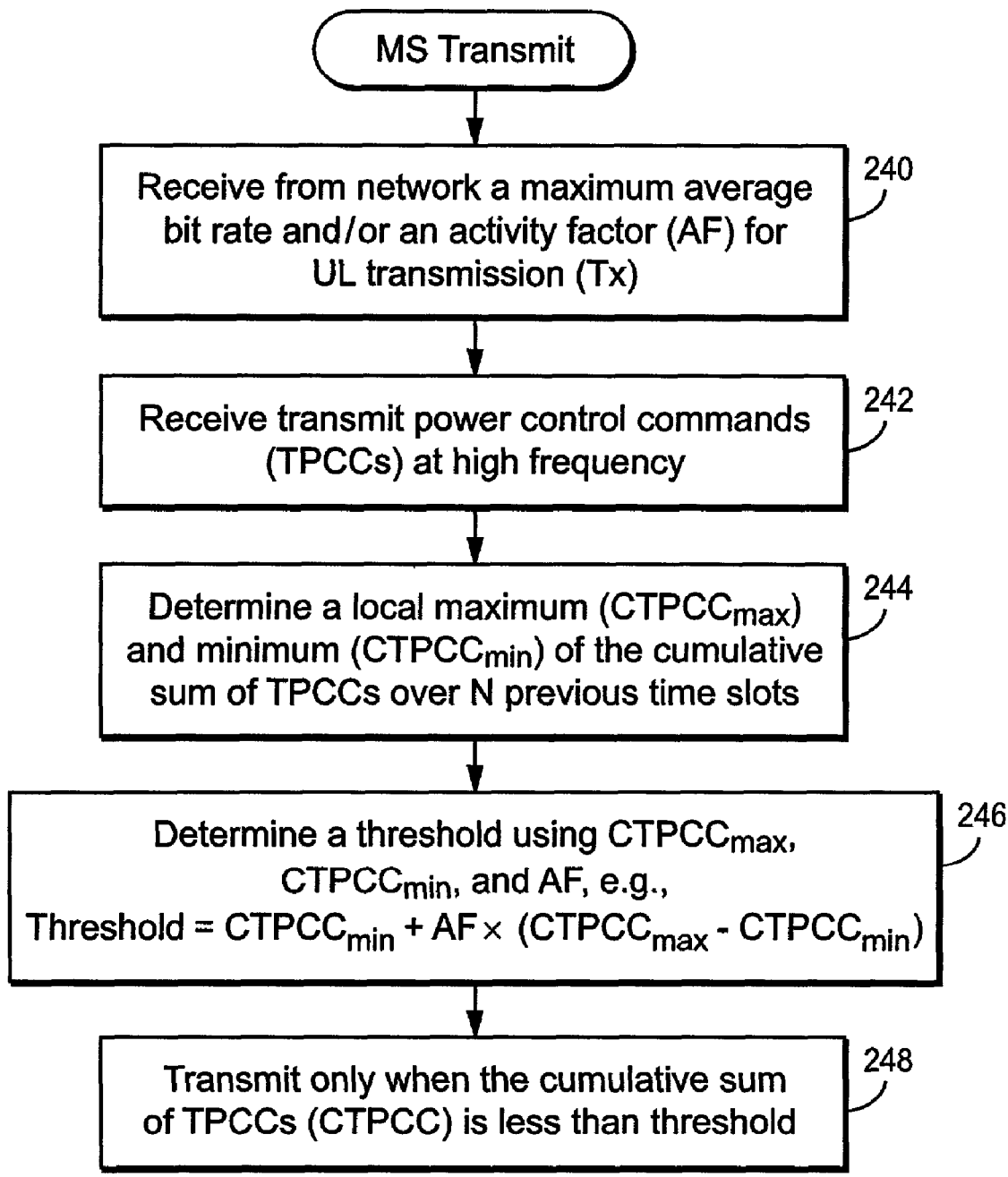
FIG. 12 is another mobile station transmit routine illustrating in flowchart form example procedure.

The approach relating to equation (9) is now described in conjunction with the mobile transmit routine illustrated in flowchart format in FIG. 12. The mobile station receives from the radio network an activity factor (af) to regulate an amount of uplink transmission time as well as an optional, maximum average bit rate (block 240). This information is provided infrequently or frequently depending upon load conditions in the cell. Transmit power control commands are provided at a high frequency to the mobile station to regulate the mobile station's uplink transmit power (block 242). From these transmit power control commands, the mobile station determines a local maximum $CTPCC_{max}$ and a local minimum $CTPCC_{min}$ of the cumulative sum of TPCCs over N previous timeslots, e.g., N=150 (block 244). A threshold is determined using $CTPCC_{max}$, $CTPCC_{min}$ and the activity factor (af) in accordance with equation (9) repeated here:

$$\text{threshold} = CTPCC_{min} + \text{af} * (CTPCC_{max} - CTPCC_{min}) \quad (9)$$

(block 246). The mobile station transmits only when the CTPCC is less than the threshold (block 248).

Figure 13A:
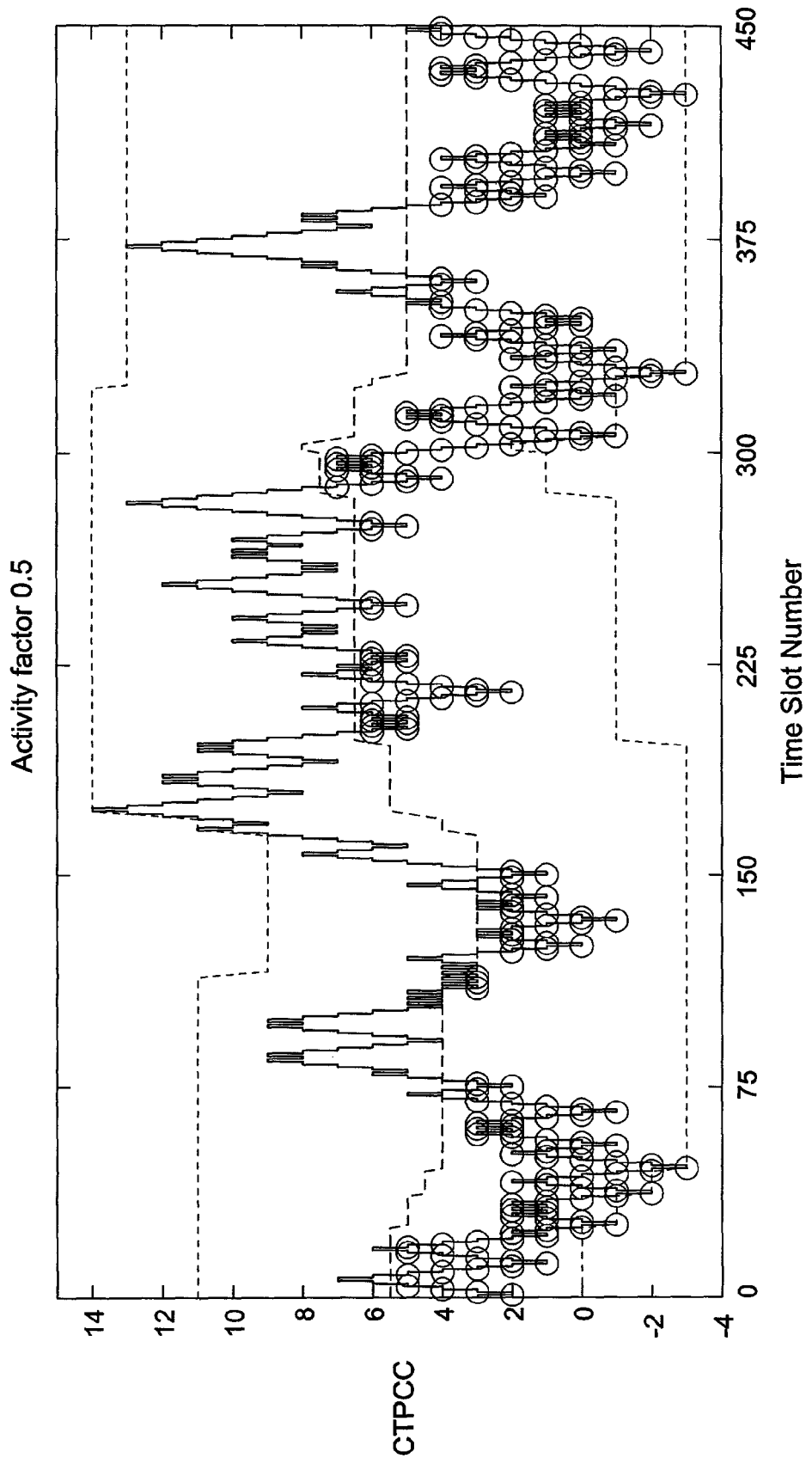
FIGS. 13A and 13B are graphs illustrating two examples of the algorithm described in FIG. 12 for determining mobile transmit times based upon cumulative transmit power control commands and activity factors.
Figure 13B:
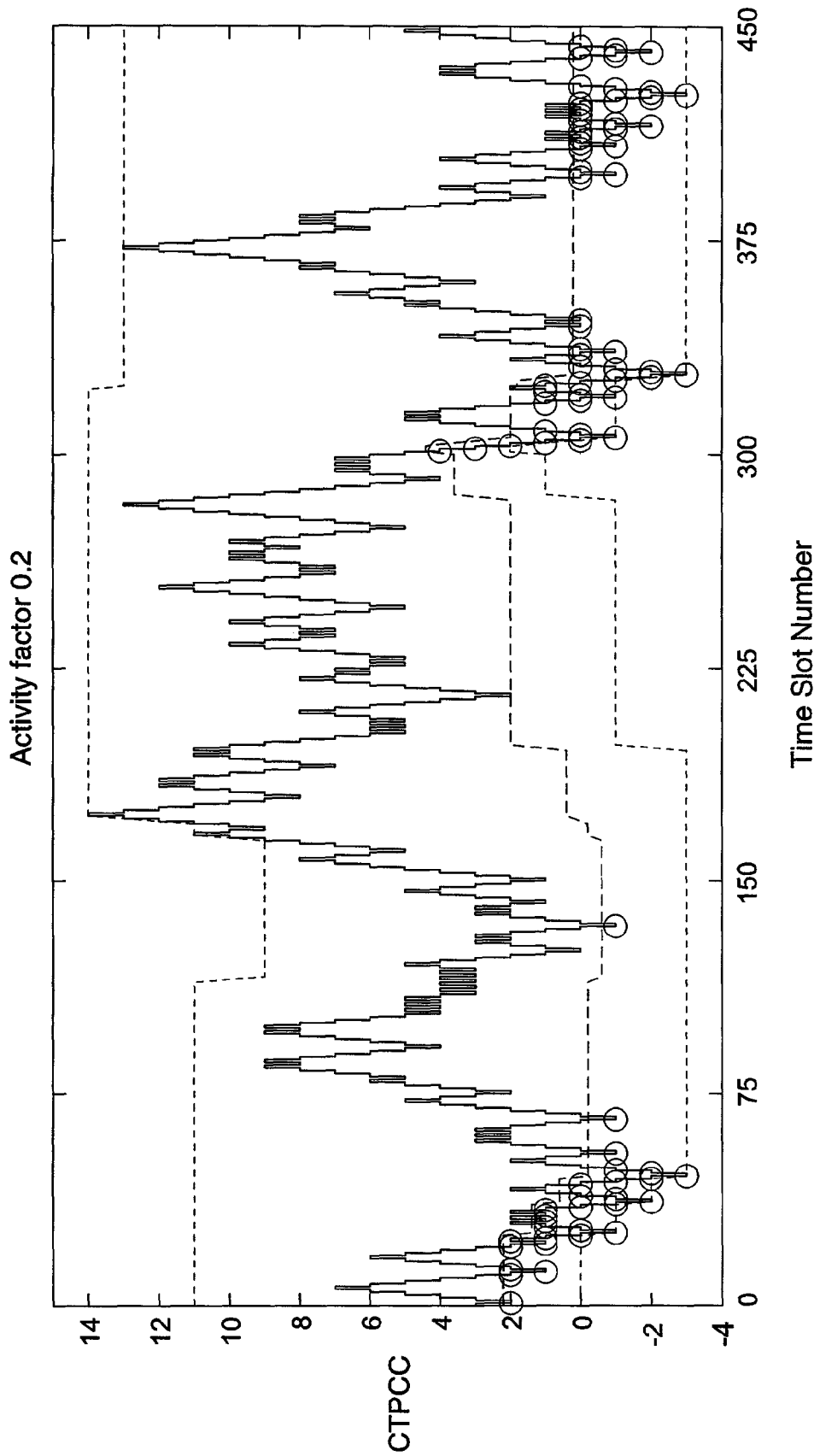

This example transmission timing algorithm is illustrated in FIGS. 13A and 13B. FIG. 13A shows an activity factor of 0.5, and FIG. 13B shows an activity factor of 0.2. The CTPCC is graphed against timeslot number. The circles indicate transmit times for the mobile station. Comparing FIGS. 13A and 13B, the larger number of circles means more transmission times because there is a lower threshold when there is a higher activity factor. As described above, the mobile station may also adapt its bit rate depending upon channel conditions up to a maximum bit rate.

The radio network is provided with a tool for limiting uplink interference by controlling the probable number of simultaneously transmitting mobile stations. At the same time, each of the mobile stations can adapt to a rapidly varying channel condition by transmitting during favorable channel conditions, and by not transmitting during unfavorable channel conditions. As a result, mobile station uplink power may be decreased, which reduces the uplink interference level and increases system capacity. Alternatively, higher peak bit rates may be used that otherwise could not be used absent the uplink interference control of the present invention. Still further, additional signaling overhead or delay caused by a deterministic transmission scheduling procedure may be avoided by using already-existing, fast transmit power control commands to determine favorable and unfavorable channel conditions. Another advantage is the automatic and momentary reduction of transmission intensity when the channel abruptly degrades. Since the CTPCC average adapts more slowly than the CTPCC itself, transmission instances are reduced until the filtered CTPCC has adapted to the new level. Consequently, the other control mechanisms have sufficient tune to act, e.g., reduce the average data rate for a user under deteriorating propagation conditions.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method implemented in a mobile terminal for controlling transmissions from the mobile terminal over a radio channel to a base station in a radio network, comprising:

after a communication session is established involving the mobile terminal, the mobile terminal receiving from or by way of the base station a percentage or fraction of time that the mobile terminal may transmit over the radio channel;

the mobile terminal then determining a current or future condition of the radio channel; and the mobile terminal restricting when the mobile terminal transmits over the radio channel to the base station during the communication session based on the percentage or fraction of time that the mobile terminal may transmit over the radio channel and the current or future condition of the radio channel, wherein the mobile terminal transmits over the radio channel when the determined radio channel condition is favorable and does not transmit over the radio channel when the radio channel condition is unfavorable, wherein the determining a current or future condition of the radio channel includes receiving channel condition messages from the radio network at a high frequency, wherein each of the channel condition messages includes a transmit power control command (TPCC) to either increase or decrease transmit power, the method further comprising:

determining a cumulative TPCC (CPTCC) value and an average channel condition value from received TPCCs;

comparing the CTPCC value to the average channel condition value; and determining when to transmit based on the comparison.

2. The method in claim 1, wherein the average condition is a local average condition.

3. The method in claim 1, further comprising:
the mobile terminal determining a bit rate to transmit over the radio channel in view of the favorable channel condition.

4. The method in claim 3, further comprising:
the mobile terminal limiting the bit rate to an average maximum bit rate.

5. The method in claim 1, further comprising:
the mobile terminal determining a power level for the mobile terminal to transmit over the radio channel in view of the favorable channel condition.

6. The method in claim 1, further comprising:
the mobile terminal determining an amount of time to transmit using the percentage of time the mobile terminal may transmit.

7. The method in claim 1, further comprising considering an activity factor in determining when to transmit.

8. The method in claim 7, further comprising:
estimating an activity of the mobile radio based on a current activity level, and
setting an activity factor threshold based on an activity factor received from the radio network and the estimated activity.

9. The method in claim 7, further comprising:
receiving an activity factor from different radio base stations in the radio network, and selecting a lowest one of the activity factors.

10. The method in claim 1, further comprising:
determining a local maximum CTPCC value and a local minimum CTPCC value;
determining a threshold using the local maximum CTPCC value and the local minimum CTPCC value and the percentage or fraction of time that the mobile terminal may transmit over the radio channel;
comparing the CTPCC value to the threshold; and
determining when to transmit based on the comparison.

11. The method in claim 10, wherein for a higher percentage, the threshold is higher, and for a lower percentage, the threshold is lower.

12. The method in claim 1, wherein the current condition is fast fading, and wherein transmissions from the mobile radio are restricted to times when the fast fading of the radio channel is constructive.

13. A method implemented in a mobile terminal for controlling transmissions from the mobile terminal over radio channel to a base station in a radio network, comprising:
after a communication session is established involving the mobile terminal, the mobile terminal determining an activity factor that defines an amount of time relative to a total time that the mobile terminal may transmit over the radio channel to the base station;
the mobile terminal receiving transmit power control commands (TPCCs) from the radio network to either increase or decrease transmit power; and
the mobile terminal determining when to transmit from the mobile terminal over the radio channel to the base station based on the activity factor and the received TPCCs, wherein the received TPCCs indicate a condition of the radio channel; and
wherein the mobile terminal transmits over the radio channel when the radio channel condition is favorable and does not transmit over the radio channel when the radio channel condition is unfavorable,
the method further comprising:
determining a cumulative TPCC (CPTCC) value and an average channel condition value from received TPCCs;
comparing the CTPCC value to the average channel condition value; and
determining when to transmit based on the comparison.

14. The method in claim 13, wherein the received TPCCs indicate a condition of the radio channel.

15. The method in claim 13, wherein the average channel condition is determined using a low pass filter.

16. The method in claim 15, wherein the averaged TPCC value is determined using the following:

$$P_{filt\_new} = \lambda * P_{filt\_old} + (1-\lambda) * CTPCC_{new},$$

wherein $P_{filt\_new}$ is a new average channel condition value, $\lambda$ is a constant between 0 and 1, $P_{filt\_old}$ is a previous average channel condition value, and CPTCC is the cumulative sum of the TPCCs over a predetermined time period.

17. The method in claim 16, further comprising:
transmitting when $CTPCC_{new} < P_{filt\_new} + f(af)$,
wherein $f(af)$ is parameter that takes into account an activity factor (af).

18. The method in claim 17, wherein the activity factor is determined based on statistical variations in a difference between CTPCC and $P_{filt\_new}$.

19. The method in claim 17, wherein $f(af)$ is determined using one of the following:

$$f_1(af) = f_{max} * 2 * (af-0.5)$$

$$f_2(af) = f_{max} * 8 * (af-0.5)^3 * sign(af-0.5).$$

20. The method in claim 13, further comprising:
determining a local maximum CTPCC value $CPTCC_{max}$ and a local minimum CTPCC value $CPTCC_{min}$;
determining a threshold using the local maximum CTPCC value and the local minimum CTPCC value and the activity factor (af);
comparing a CTPCC value to the threshold; and
determining when to transmit based on the comparison.

21. The method in claim 20, wherein the $$threshold = CTPCC_{min} + af * (CTPCC_{max} - CTPCC_{min})$$

wherein the mobile station transmits only when the current CTPCC value is less than the threshold, and
wherein for a higher activity factor, the threshold is higher, and for a lower percentage, the threshold is lower.

22. The method in claim 13, the method further comprising:
- using the received TPCCs to determine whether the radio channel is in a constructive or destructive fade,
- wherein the restricting includes transmitting only during a constructive fade.

23. A mobile terminal configured to transmit over radio channel to a base station in a radio network, comprising:
- radio transceiving circuitry for transmitting to and receiving from the base station in the radio network, and
- electronic circuitry coupled the radio transceiving circuitry and configured to:
  - determine, after a communication session is established involving the mobile terminal, a percentage or fraction of time that the mobile terminal may transmit over the radio channel to the base station;
  - then determine a current or future condition of the radio channel; and
  - restrict when the mobile terminal transmits over the radio channel to the base station during the communication session based on the percentage or fraction of time that the mobile terminal may transmit over the radio channel and the current or future condition of the radio channel,
- wherein the electronic circuitry is configured to:
  - permit transmission over the radio channel when the determined radio channel condition is favorable and to prevent transmission over the radio channel when the radio channel condition is unfavorable,
  - receive channel condition messages from the radio network at a high frequency where each of the channel condition messages is a transmit power control command (TPCC) to either increase or decrease transmit power, and
  - compare a cumulative TPCC (CTPCC) value to an average channel condition value and to determine when to transmit based on the comparison.

24. The mobile terminal in claim 23, wherein the average condition is a local average condition.

25. The mobile terminal in claim 23, wherein the electronic circuitry is configured to determine a bit rate for the mobile terminal to transmit over the radio channel in view of the favorable channel condition.

26. The mobile terminal in claim 25, wherein the electronic circuitry is configured to limit the bit rate to an average maximum bit rate.

27. The mobile terminal in claim 26, wherein for a higher percentage, the threshold is higher, and for a lower percentage, the threshold is lower.

28. The mobile terminal in claim 23, wherein the electronic circuitry is configured to determine a power level for the mobile terminal to transmit over the radio channel in view of the favorable channel condition.

29. The mobile terminal in claim 23, wherein the electronic circuitry is configured to determine an amount of time to transmit using the percentage of time the mobile terminal may transmit.

30. The mobile terminal in claim 23, wherein the electronic circuitry is configured to consider an activity factor in determining when to transmit.

31. The mobile terminal in claim 30, wherein the electronic circuitry is configured to:
- estimate an activity of the mobile radio based on a current activity level, and
- set an activity factor threshold based on an activity factor received from the radio network and the estimated activity.

32. The mobile terminal in claim 30, wherein the electronic circuitry is configured to:
- receive an activity factor from different radio base stations in the radio network, and
- select a lowest one of the activity factors.

33. The mobile terminal in claim 23, wherein the electronic circuitry is configured to:
- determine a local maximum CTPCC value and a local minimum CTPCC value;
- determine a threshold using the local maximum CTPCC value and the local minimum CTPCC value and the percentage or fraction of time that the mobile terminal may transmit over the radio channel;
- compare the CTPCC value to the threshold; and
- determine when to transmit based on the comparison.

34. The mobile terminal in claim 23, wherein the current condition is fast fading, and wherein the electronic circuitry is configured to restrict transmissions from the mobile radio to times when the fast fading of the radio channel is constructive.

* * * * *

UNITED STATES PATENT AND TRADEMARK OFFICE
CERTIFICATE OF CORRECTION

PATENT NO. : 8,009,607 B2  
APPLICATION NO. : 10/128583  
DATED : August 30, 2011  
INVENTOR(S) : Gunnarsson et al.

Page 1 of 1

It is certified that error appears in the above-identified patent and that said Letters Patent is hereby corrected as shown below:

On The Title Page, Item (56), under "OTHER PUBLICATIONS", in Column 2, Line 2, delete "Orthogona" and insert -- Orthogonal --, therefor.

In The Specification

In Column 5, Line 25, delete "procedure;" and insert -- procedures; --, therefor.

In Column 5, Lines 39-40, delete "GFRS/UMTS systems, the technolgy" and insert -- GPRS/UMTS systems, the technology --, therefor.

In Column 7, Line 4, delete "vang" and insert -- varying --, therefor.

In Column 12, Line 34, delete "tune" and insert -- time --, therefor.

Signed and Sealed this  
Seventh Day of June, 2016

Michelle K. Lee  
*Director of the United States Patent and Trademark Office*